United States Patent
Szebesta et al.

(10) Patent No.: US 6,223,562 B1
(45) Date of Patent: *May 1, 2001

(54) ETCHING A HALIDE GLASS TUBE, REMOVING THE ETCHANT, AND FORMING AN OPTICAL FIBER

(75) Inventors: Daryl Szebesta; John Richard Williams; Steven Terrence Davey, all of Suffolk (GB)

(73) Assignee: British Telecommunications Public Limited Company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,129

(22) Filed: Oct. 17, 1996

Related U.S. Application Data

(62) Division of application No. 08/408,193, filed on Mar. 22, 1995, now Pat. No. 5,618,326, which is a continuation of application No. 08/157,015, filed as application No. PCT/GB92/01778 on Sep. 29, 1992.

(30) Foreign Application Priority Data

Sep. 30, 1991 (GB) .................................. 9120701

(51) Int. Cl.$^7$ .................................................. C03B 37/012
(52) U.S. Cl. .............................. 65/388; 65/429; 65/412; 65/31; 136/22.12; 216/24; 216/97
(58) Field of Search ........................... 65/388, 429, 412, 65/31; 134/22.12, 22.18, 166 C, 169 C; 216/97, 24

(56) References Cited

U.S. PATENT DOCUMENTS

| | | | |
|---|---|---|---|
| 4,668,263 | * | 5/1987 | Yokota . |
| 4,832,752 | * | 5/1989 | Nezworski ........................ 134/22.12 |
| 4,863,555 | * | 9/1989 | John . |
| 4,898,777 | * | 2/1990 | Kindler . |
| 5,106,400 | * | 4/1992 | Trck ..................................... 65/383 |

* cited by examiner

*Primary Examiner*—John Hoffmann
(74) *Attorney, Agent, or Firm*—Nixon & Vanderhye

(57) ABSTRACT

The surface quality of halide, preferably fluoride, articles, e.g., articles used in the preparation of halide fibers is improved by cleaning the surface with an aqueous etchant and thereafter removing the etchant by washing the surface with methanol. The aqueous etchant is preferably a solution which contains hydrochloric acid and zirconium oxychloride.

2 Claims, 1 Drawing Sheet

1

ETCHING A HALIDE GLASS TUBE, REMOVING THE ETCHANT, AND FORMING AN OPTICAL FIBER

RELATED APPLICATIONS

This is a division of Ser. No. 08/408,193 filed Mar. 22, 1995 (now U.S. Pat. No. 5,618,326 issued Apr. 8, 1997) which is, in turn, an File Wrapper Continuation of Ser. No. 08/157,015 filed Nov. 30, 1993 (now abandoned) which is, in turn, a US national phase filing of PCT/GB92/01778 filed Sep. 29, 1992.

BACKGROUND OF THE INVENTION

1. Field of the Invention

This invention relates to the surface treatment of articles made from halide glasses and, in particular, to the surface treatment of fluoride glass articles. The surface treatment is carried out for the purpose of improving the surface quality.

2. Related Art

Halide glasses find particular application in the preparation of fibre, and the most usual way of preparing fibre is by stretching a suitable preform. It has long been recognised that the surface condition of the preform can have a substantial effect upon the performance of the fibre, and it is well established practice to treat the surfaces of halide glass articles in order to improve the performance of fibre which results therefrom.

The most commonly used articles in the preparation of fibres are as follows:

Preforms

A preform consists of a region formed of the core glass surrounded by a region formed of the cladding glass. The preform has the same configuration as the fibre but it is substantially shorter and substantially greater in cross-sectional area. The preforms are usually made by casting a tube of the cladding glass and, after the cladding has solidified but before it has substantially cooled, casting the core glass into the bore of the tube. At this stage the whole preform is allowed to cool to room temperature. This method gives a good interface between the core glass and the cladding glass, but the quality of the outer surface is often inadequate and the mechanical strength of the resulting fibre is substantially reduced. Standard preforms usually have a diameter of 10–20 mm.

Tubes

Tubes of halide glass are often utilised in the preparation of halide fibres. Tubes with 10–20 mm OD and 1–10 mm ID are particularly suitable. The tubes are used in conjunction with cast preforms as described above when it is desired to reduce the core/cladding ratio of the preform (i.e. to make the core smaller in comparison with the cladding).

This technique is used when it is desired to produce fibre with small cores. If the preform is made by casting, then it is either necessary to cast a small core into an inconveniently small bore or else it is necessary to cast an inconveniently large cladding to produce a preform which has an inconveniently large diameter for fibre drawing. These mechanical difficulties can be avoided by casting a preform with a convenient core size and stretching the preform so that its diameter is reduced by about 2–10 times. The diameter of the stretched preform is usually less than 10 mm and it contains too little cladding. The amount of cladding can be increased by the use of a tube of cladding glass.

Thus a cast and stretched preform can be placed in the bore of the tube and, using techniques known to persons skilled in the art, the tube can be shrunk until it engages with the outer surface of the preform and the outer surfaces become united, e.g. by fusion. In order for this process to operate satisfactorily it is necessary that the mating surfaces be clean and, therefore, it is necessary to provide treatments for cleaning the surfaces. Any defects which hinder the mating of the surfaces are liable to reduce the strength and increase the attenuation of the resulting fibre.

Rods

Rods cast from halide glasses are also used in the preparation of fibre and this provides an alternative to the use of cast preforms mentioned above. This technique comprises casting a rod of the core glass and then shrinking a tube of the cladding glass onto the rod using the technique mentioned above. When this technique is employed, the quality of the surface of the rod is of great importance because energy transfer usually extends into the innermost regions of the cladding which means that the core/cladding interface forms part of the path region. Therefore defects in the interface can have an unacceptable effect upon the attenuation of the fibre as well as having an adverse effect upon its mechanical properties. For this reason it is important that the surface of the rod and the inner surface of the tube have high quality. It should also be realised that defects in the outer surface of the tube may lower the tensile properties of the resulting fibre for the reasons given above.

Thus, it is well established that the surface quality of articles used in the preparation of halide glass fibres is of great importance and, therefore, surface treatments have been proposed. This treatment sometimes includes mechanical polishing which may use abrasives. Such techniques are valuable when casting leaves a rough surface. The polishing can remove the roughness. However polishing tends to leave contamination on the surface, for example the residues of the abrasives may remain on the surface. Even if mechanical polishing is not used the surface may be contaminated and such contamination may result in the defects enumerated above.

For this reason it is usual to clean the surface chemically, e.g. by removing a thin surface layer of glass so as to expose a clean and uncontaminated surface. It has been found that aqueous etchant solutions, e.g. solutions containing hydrochloric acid and zirconium oxychloride are particularly effective for cleaning the surface of a fluoride glass article. Etchants of this nature are described in U.S. Pat. No. 4,631,114.

Once the etching described above has been completed, it is necessary to remove the etchant from the surface of the glass article. This has been carried out by washing the article in pure water and thereafter removing the water by washing with organic solvents, which can be allowed to evaporate.

U.S. Pat. No. 4,898,777 uses an aqueous etchant based on $H_3BO_3$ and this is removed by rinsing with water optionally containing $HNO_3$ or HCl. A volatile solvent such as acetone or volatile alcohols (eg methanol, ethanol and isopropanol alcohol) may be used to assist drying.

We have found, most surprisingly, that the surface quality fluoride glass articles can be substantially increased by modifying the technique used to remove the etchant. This is particularly important where the glass article is a precursor for the preparation of optical fibre.

SUMMARY OF THE INVENTION

According to this invention the etching process is terminated by washing the glass article with methanol. It is preferred to use a dry methanol, eg. having a water content below 0.01% w/v, (i.e. less than 0.01 gms of water per 100 ml of solution). For example the article is transferred to a bath of methanol where it remains for long enough to remove the etchant. The methanol will evaporate, e.g. after the article is removed from the bath, and this evaporation causes no deterioration in the surface quality of the article. The aqueous etchant is preferably a conventional etchant, eg as mentioned above, namely an aqueous solution of hydrochloric acid and zirconium oxychloride.

Figure 1:
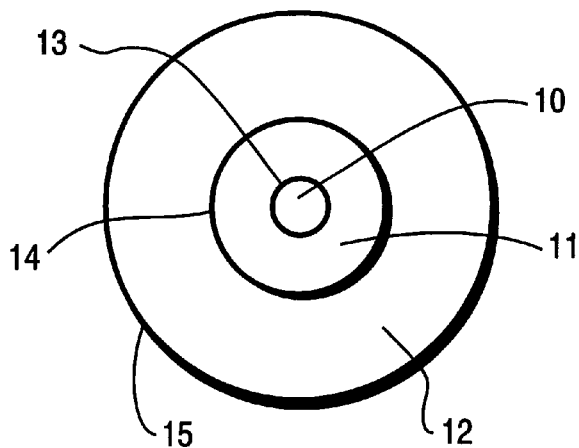
FIG. 1 is a cross-sectional view of a configuration of preforms according to the invention.
Figure 2:
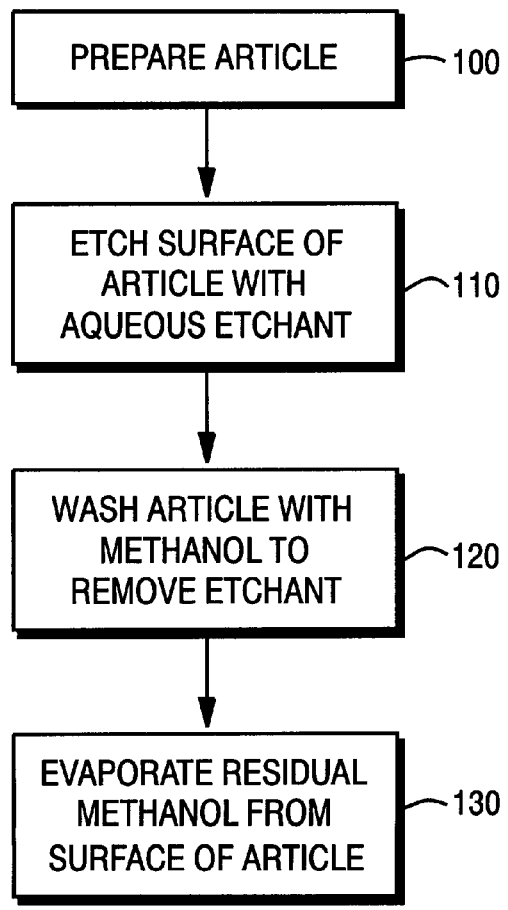
FIG. 2 shows steps involved in a method of the invention.

The technique of the invention can be applied to the complete range of halide glasses wherein at least 90%, and preferably all, of the halide is fluoride. The metals which are used to make the fibre may be selected from Zr, Hf, Ba, La, Al, Li, Na, K, Pb, Cs, Bi, Be, Y and the rare earths. (The rare earths are lasing dopants.) Preferred glasses contain halides of Zr and/or Hf together with halides of Ba and, optionally, at least one other halide from the above list.

Some specific embodiments of the invention will now be described by way of example. Four different fluoride glass compositions were used in these examples. The four compositions are identified in Table I.

TABLE I

| GLASS | A | B | C | D |
|---|---|---|---|---|
| $ZrF_4$ | 53 | 51.5 | 40 | 51.8 |
| $HfF_4$ | — | — | 13.3 | — |
| $BaF_2$ | 20 | 19.5 | 17.9 | 19.5 |
| $LaF_3$ | 4 | 5.3 | 4 | 4.6 |
| $AlF_3$ | 3 | 3.2 | 2.9 | 3.2 |
| NaF | 20 | 18 | 21.9 | 18 |
| $PbF_2$ | — | 2.5 | — | — |
| RI | 1.4985 | 1.5056 | 1.4935 | 1.5075 |

The numbers quoted (except refractive indices) in Table I represent mole percent of the relevant component.

The compositions defined in Table I can also be used as hosts for dopants, e.g. metal fluorides. Dopants are used to confer active properties on the composition. Active properties include lasing for use in fibre amplifiers and varying the refractive index for use in switching devices. The rare earths, especially Er, Nd and Pr, Ho and Yb are particularly suitable as dopants.

The same aqueous etchant was used in all the examples and the comparison. This etchant consisted of 0.4 molar $ZrOCl_2 \cdot 8H_2O$ and 1 molar HCl in water.

EXAMPLE 1

Two similar preforms were prepared using a conventional casting technique in which a tube of Glass A was centrifugally cast and Glass B was poured into the bore of the tube. Glasses A and B are defined in Table I. Each preform was 100 mm long. Diameter of the core was 5 mm and the cladding was 2.5 mm thick, so that the diameter of the preform was 10 mm.

The surface of each preform was cleaned by etching with the aqueous etchant defined above. This etching comprised immersion for 25 minutes at ambient temperature (about 20° C.). After immersion each of the preforms was washed to terminate the etching. One preform (selected at random) was subjected to a methanol wash in accordance with this invention whereas the other preform was washed in (pure) water followed by washing in isopropanol.

In accordance with the invention, the washing comprised 15 minutes immersion in (1 liter) pure methanol. During this immersion the preform was spun while the methanol was subjected to ultrasonic agitation. Afterwards the methanol was allowed to evaporate by agitation in air.

The conventional wash comprised immersion in pure water with spinning but without ultrasonic agitation. After washing in water the preform was washed in a bath of isopropanol while the isopropanol was subjected to ultrasonic agitation. This replaced the residual water by residual isopropanol which was allowed to evaporate by agitation in air.

After etching and washing as described above, each of the preforms was pulled into fibre and 20 samples were cut from each of the fibres for the measurement of breaking strain. The percentage breaking strain of each sample is given in Table II in which the breaking strains are arranged in order of magnitude.

TABLE II

| METHANOL | WATER/ISOPROPANOL |
|---|---|
| 2.3 | 1.8 |
| 2.4 | 1.8 |
| 2.5 | 1.9 |
| 2.5 | 1.9 |
| 2.6 | 2.0 |
| 2.7 | 2.0 |
| 2.8 | 2.0 |
| 2.9 | 2.0 |
| 3.1 | 2.1 |
| 3.1 | 2.2 |
| 3.1 | 2.2 |
| 3.2 | 2.3 |
| 3.2 | 2.3 |
| 3.2 | 2.3 |
| 3.3 | 2.4 |
| 3.3 | 2.5 |
| 3.3 | 2.6 |
| 3.4 | 2.7 |
| 3.7 | 2.8 |
| 4.2 | 2.9 |

The median value of the breaking strain for samples washed in methanol was 3.1% which compares with 2.2% for samples washed in water in accordance with the prior art. This is a significant and valuable improvement in the breaking strain. It will also be noted that the best values obtained with the conventional water wash are slightly less than the median values obtain in accordance with the invention.

It was also observed that the fibre washed in accordance with the invention had a more uniform diameter than fibre washed with water in accordance with the prior art.

Example 1 gives etch and wash conditions suitable for preforms or rods having an external diameter in the range 10–20 mm. For preforms and rods having a diameter less than 10 mm, it is recommended that the etching time be reduced, e.g. to about 4 or 5 minutes followed by 10 minutes for rinsing in methanol. In the case of tubes, e.g. tubes with outside diameters in the range 10–20 mm, and internal diameters in the range of 1–10 mm, the following two stage procedure is recommended. The first stage comprises treating the tube in the same way as a standard preform described above. The second stage comprises passing aqueous etchant through the bore of the tube using turbulent flow. After 5 mins, methanol is added to the etchant in increasing concentrations until, at the end of the procedure, the bore is washed with pure methanol. The whole procedure takes about 20 minutes.

In addition to the improved breaking strains as mentioned above, it was also observed that the attenuation of the fibre was decreased.

EXAMPLE 2

This example describes the preparation of a preform with a small core for conversion to monomode fibre. It is difficult to make small cores by the method described in Example 1 because it is difficult to cast a tube with a small bore.

A tube of Glass C (cladding) was centrifugally cast and a composition being Glass D doped with $ErF_3$ was cast into the bore of the tube whereby Doped Glass D formed the core and Glass C formed the cladding of a first preform. The diameter of the core was 5 mm and the cladding was 2.5 mm thick so that the external diameter was 10 mm. The first preform, which was 100 mm long, was stretched to reduce the cross-sectional area of both the core and the cladding, although the ratio (area of core):(area of cladding)

was not altered. The diameter of the core was reduced by this stretching to 0.5 mm, which implied that the first preform was stretched to a length of 10 M and its external diameter was reduced to 1 mm. In order to restore the original diameter of 10 mm, a segment, 100 mm long, of the stretched first preform was jacketed with a tube of Glass C. The jacketing was carried out using conventional glass handling techniques in which the stretched, first preform was placed inside the bore of the tube and the tube was shrunk to make contact with the preform. The process was carried out by heating to a temperature sufficient to soften the glass so that the mating surfaces became unified by fusion. It is, however, important that the mating surfaces have good quality, because imperfections and impurities substantially degrade the performance of the product.

Before jacketing, the surfaces were cleaned and washed in accordance with the invention. The tube and the first preform were both etched using the solution specified above. As described in Example 1, the tube was placed first in an etchant bath and then in a washed in a bath of methanol. Thus the outer and inner surfaces of the tube were both etched and then washed simultaneously. The inner surface of the tube was then re-etched by using turbulent flow to pass etchant and washing solutions through the bore. Initially, the solution was the pure etchant but methanol was added to the etchant solution which was gradually diluted until pure methanol was flowing through the bore of the tube. This process took 15 minutes, after which the residual methanol was allowed to evaporate.

The stretched preform was spun for 1½ minutes in the etchant, and then rinsed in 1 liter of methanol for 5 minutes. The etched tube was then shrunk onto the etched preform as described above.

It was found that washing with methanol in accordance with the invention gave a good interface in the preform which could be stretched to good quality fibre. In comparative experiments, using water/isopropanol for washing, it was found that the surface was degraded and it was very difficult to achieve a good mating. In these comparative experiments, it was very difficult to draw the preforms into fibre and the quality of the resulting fibre was not assessed.

The configuration of the preforms, and the fibres resulting from them, is illustrated in the drawing.

As shown in the drawing, the preform produced by Example 2 comprises a core 10 which is surrounded by an inner cladding 11, which, in its turn, is surrounded by an outer cladding 12 which had the same composition as the inner cladding 11. The interface 13 between the core and the inner cladding was produced by casting a molten glass into the bore of a hot tube and the washing of the invention is not relevant to this interface. The interface 14 between the inner and outer cores was produced by shrinking the tube onto the first preform and the quality of this interface was improved by washing in accordance with the invention. The outer surface 15 was also washed in accordance with the invention, and, as shown in Table I, the quality of this surface affects the mechanical stretch of the fibre.

The method described in Example 2 is also applicable to rod-in-tube processes for making fibre. In this case there is no interface corresponding to 14 but the interface 13 is produced by uniting surfaces and washing in accordance with the invention is applicable to this interface.

In order to appreciate the improvement produced by the invention, it should be remembered that, while most of the energy transfer occurs in the core, a small proportion of transfer occurs in the inner layers of cladding. It is, therefore, to be expected that improving the quality of the core/cladding interface 13 will have a direct and beneficial effect on the attenuation of the fibre. The improved surfaces achieved by washing in accordance with the invention therefore have a direct effect upon attenuation where the core/cladding interface is produced by a rod in tube process.

In the case, illustrated in Example 2, where a tube is shrunk onto a small preform the new interface 14 is located in the in the interior of the cladding where there is little or no energy transfer. It is apparent that such a surface could affect the mechanical strength of the resulting fibre, but it may be surprising that there is an effect on the attenuation because there is no energy transfer at this interface. Nevertheless, in the softened state used for drawing, mechanical imperfections are transferred through the inner layers of cladding, and noticeable effects are produced in the region where energy transfer takes place. Therefore, even in this case, the surface quality has an effect upon attenuation and washing in accordance with the invention improves the attenuation.

By way of comparison, the technique of the invention was attempted with organic solvents other than methanol. Ethanol and isopropanol were used in these comparative tests. Each test comprised cleaning the surface of an article made from one of the glasses specified in table 1 above wherein said cleaning was carried out using an aqueous etchant which consisted of 0.4 molar zirconium oxychloride ($ZrOCl_2 \cdot 8 H_2O$) and 1 molar HCl. (This is the same etchant that was used in example 1 and its use is conventional.) After etching the etchant was removed, in some tests, with isopropanol and in the other tests with ethanol. Not one of these test give a satisfactory result. These tests can be regarded either as a modification of the invention in which the use of methanol is replaced either by ethanol or isopropanol or they can be regarded as a modification and a conventional technique in which the water wash is eliminated.

The results given by ethanol and isopropanol were unsatisfactory because there was a visible deposit on the surface of the glass article. As explained above, etching is carried out in order to clean the surface. If the cleaning technique leaves a dirty surface it is apparent that the cleaning technique is unsatisfactory Thus, the invention pertains to a method of making a fibre waveguide from halide glasses. The method comprises preparing a fibre preform and thereafter drawing the preform into the fibre. The preparation of the preform comprises:

(I) casting a tube of halide cladding glass, (II) casting a halide core glass in the bore of the tube to produce a preform having an outer surface, and (III) cleaning the outer surface of the preform.

The cleaning (III) comprises:

(a) immersing the preform in an aqueous etchant whereby the outer surface is etched, (b) washing the aqueous etchant from the outer surface by means of methanol whereby the etching is terminated, and (c) allowing the residual methanol to evaporate.

Preferably all of the halide glass is a fluoride glass and the methanol contains less than 0.0% w/v of water.

The invention also concerns a method of making a fibre waveguide from halide glasses, which method comprises preparing a fibre preform and thereafter drawing the preform into the fibre. Preparation of the preform comprises:

(i) preparing either (x) a rod of a halide core glass, the rod having an outer surface, or (y) a rod comprising an inner portion of a halide core glass surrounded by an outer portion of a halide cladding glass, the outer portion having an outer surface constituting the outer surface of the rod;

(ii) preparing a tube of a halide cladding glass, the tube having an internal and an external surface, (iii) cleaning each of the external, internal and outer surfaces, and thereafter, (iv) shrinking the tube onto the rod whereby the internal surface mates with the outer surface of the rod.

The cleaning comprises, in each case, (a) immersing the tube and the rod in an aqueous etchant whereby all of the surfaces are etched, (b) washing all of the etchant off all of the surfaces by methanol whereby the etching is terminated, and (c) allowing the residual methanol to evaporate.

Preferably all of the halide glass is a fluoride glass, and the methanol contains less than 0.01% w/v of water.

The invention further includes a method of improving the surface of a halide glass article, which method comprises immersing the article in an aqueous etchant and thereafter washing the article with methanol to remove the etchant, and allowing the residual methanol to evaporate from the surface of the article. The halide of the glass is preferably at least 90 mole % fluoride, and the remainder of the halide is chloride. The halide of the glass can be 100% fluoride. The glass preferably contains at least one halide of Zr, Hf, Ba, La, Al, Li, Na, K, Pb, Cs, Bi, Be and Y and a rare earth or other active dopant. A weekly acidic aqueous etchant can be used, such as an aqueous etchant containing hydrochloric acid and zirconium oxychloride. The halide glass article is selected from tubes of halide glass, rods of halide glass and fibre preforms comprising a core of a first halide glass surrounded by and in contact with a cladding of a different halide glass. The methanol contains less than 0.01% w/v of water.

What is claimed is:

1. A method of improving a surface of a bore of a tube of a halide glass, the method comprising:

passing an aqueous etchant solution through the bore of the tube whereby the surface of the bore is etched;

and terminating said etching by initially adding methanol to the aqueous etchant solution and passing the methanol-containing aqueous solution through the bore of the tube and thereafter increasing the concentration of the methanol in the aqueous solution thereby decreasing the concentration of the etchant in the aqueous solution until, over time, pure methanol flows through the bore of the tube, whereby etching is terminated and etchant is removed from the surface of the bore; and evaporating the methanol from the surface of the bore.

2. A method of making fiber waveguide which method comprises preparing a fiber preform and thereafter drawing said preform into a fiber, wherein said preparation of said preform comprises:

(i) preparing a rod of a halide core glass, said rod having an outer surface;

(ii) preparing a tube of a halide cladding glass, said tube having a bore defined by an internal surface of the tube, (iii) cleaning the bore of the tube, and thereafter, (iv) shrinking said tube onto said rod whereby said internal surface mates with the outer surface of said rod, wherein said cleaning comprises:

passing an aqueous etchant solution through the bore of the tube whereby the surface of the bore is etched;

and terminating said etching by removing etchant from the bore, said removal comprising initially adding methanol to the aqueous etchant solution and passing the methanol-containing aqueous solution through the bore of the tube and thereafter increasing the concentration of the methanol in the aqueous solution thereby decreasing the concentration of the etchant in the aqueous solution until, over time, pure methanol flows through the bore of the tube, whereby etching is terminated and etchant is removed from the surface of the bore; and evaporating the methanol from the surface of the bore.

* * * * *